Oct. 12, 1965  G. H. BOOTH  3,211,400
LANDING GEAR STEERING APPARATUS
Filed April 15, 1964  3 Sheets-Sheet 1

GEORGE H. BOOTH,
INVENTOR.

BY
Fulwider, Patton, Rieber, Lee & Utecht,
ATTORNEYS.

Oct. 12, 1965 G. H. BOOTH 3,211,400
LANDING GEAR STEERING APPARATUS
Filed April 15, 1964 3 Sheets-Sheet 2

GEORGE H. BOOTH,
INVENTOR.

BY
Fulwider, Patton, Rieber, Lee & Utecht,
ATTORNEYS.

Oct. 12, 1965 G. H. BOOTH 3,211,400
LANDING GEAR STEERING APPARATUS
Filed April 15, 1964 3 Sheets-Sheet 3

GEORGE H. BOOTH,
INVENTOR.

BY
Fulwider, Patton, Rieber, Lee & Utecht
ATTORNEYS.

United States Patent Office 3,211,400
Patented Oct. 12, 1965

3,211,400
LANDING GEAR STEERING APPARATUS
George H. Booth, Hermosa Beach, Calif., assignor to Lionel-Pacific, Inc., Gardena, Calif., a corporation of Delaware
Filed Apr. 15, 1964, Ser. No. 359,825
10 Claims. (Cl. 244—50)

This invention relates generally to servomechanisms for aircraft controls, and more particularly to power steering apparatus for aircraft landing gears.

This invention finds its most important application in connection with hydro-mechanically powered nose wheel steering gears for heavy aircraft.

Power steering systems as heretofore employed for airplane landing gears have usually employed relatively heavy and bulky reciprocative hydraulic actuator cylinders or hydraulic or electric motor, rotary drive devices, coupled to the steerable landing wheels through suitable linkages, levers or gear trains. In each such arrangement, the actuators or motors and their associated linkages, levers or gear trains were usually so large, complicated and heavy as to require their being supported and housed within the fuselage and operatively connected to the upper attachment end of the landing gear strut, thereby necessitating the construction of the landing gear strut in such fashion as to be rotatable in its entirety about its axis, as a means for steerably pivoting the landing gear wheel or wheel truck carried thereby. The difficulties involved in such arrangements were augmented by the necessity for incorporating landing shock absorbing means in the strut requiring, in addition to rotational motion, provisions for simultaneous longitudinal motion of a porton or all of the landing gear strut, for absorbing the vertical landing shocks imposed on the wheels. The difficulties, disadvantages and inefficiencies imposed by the latter conditions were still further augmented in cases where the landing gear was required to be retractable, presenting, in all, difficulties in construction to retain the strength, rigidity, and reliability of operation so necessary in an airplane landing gear, without suffering prohibitive penalties in weight and space requirements.

Another difficulty which such steering mechanisms presented, particularly those employing geared motor drives, was that the relatively great gear reduction required between the motor input drive and the landing wheel pivot, resulted, not only in undesirable bulk and weight, but also in a great amount of backlash in the gear train, which is reflected back through the system as an intolerable amount of lost motion in the steering controls. These latter conditions resulted, not only in poor steering control characteristics, but permitted the occurrence of dangerous self-generated pivotal oscillations or so-called shimmying of the landing wheels during take-off and landing rolls.

Another disadvantage which such steering arrangements heretofore presented, particularly those employing reciprocative hydraulic actuator devices was the incapability of providing continuous 360° swiveling of the landing gear wheel relative to the aircraft without requiring special means for disconnecting the rotational coupling between such actuators and landing wheels.

The foregoing difficulties and disadvantages heretofore encountered in retractable, steerable landing gear systems are overcome by the uniquely improved steering systems of the present invention.

It is accordingly an object of this invention to provide an aircraft power steering mechanism which is light and compact.

It is a further object of the invention to provide an aircraft power steering mechanism which has a higher ratio of steering torque output and strength to weight and space requirement than heretofore known.

It is a still further object of the invention to provide a servo steering mechanism of improved reliability and positiveness of action.

It is another object of the invention to furnish an aircraft power steering system having a high gear reduction ratio between input and output thereof, yet which exhibits extremely high torsional stiffness and freedom from backlash and lost motion.

It is still another object of the invention to provide an aircraft steering system having a minimum of gear reduction stages, and having a high efficiency in steering torque and power delivered to the steering wheels.

It is a still further object of this invention to provide an aircraft landing wheel steering mechanism which permits unlimited pivotal steering action of the landing wheel without requiring disengagement thereof from the steering power system, whereby ground movements, such as taxiing and towing operations and positioning of the aircraft on flight lines, in hangars or aboard aircraft carriers may be greatly facilitated.

It is still another object of the invention to furnish a power steering mechanism which is of such lightness, compactness and unique configuration as to lend itself to un-sprung installation upon the lower, external end portion of the landing gear strut adjacent the landing wheels, permitting a clean installation both mechanically and aerodynamically and which does not interfere with the retractability or shock absorbing movement of the landing gear.

These and other objects, advantages, and features of novelty will be evident hereinafter.

In the drawings, which illustrate a presently preferred embodiment of the invention and in which like reference characters designate the same or similar parts throughout the several views.

Figure 1:
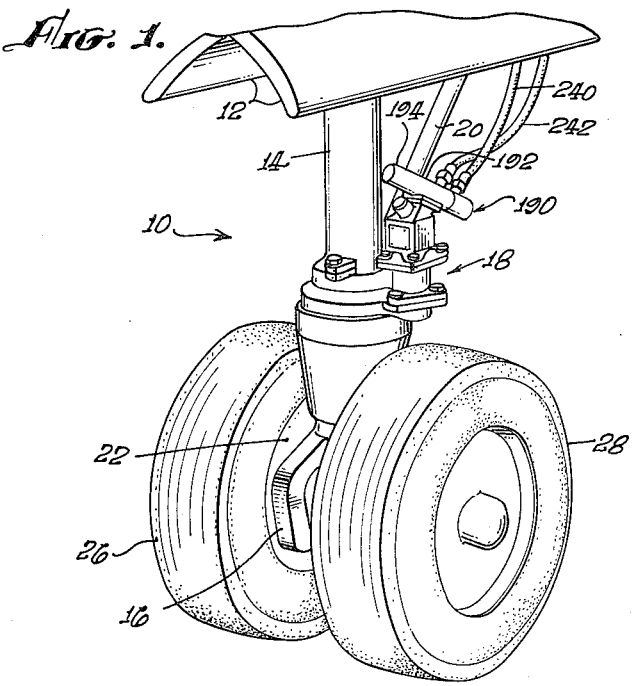
FIGURE 1 is a perspective view of the general assembly of the apparatus of the invention as it appears in association with a steerable nose wheel landing gear strut.

The apparatus is as follows:

Referring first primarily to FIGURE 1, a steerable free nose wheel landing gear assembly is shown generally at 10, as it appears fully extended from the forward portion of an aircraft fuselage, a portion of the landing gear enclosure doors carried by the fuselage being illustrated at 12.

The principal components of the nose wheel landing gear assembly 10 are, an upper elongated cylindrical or tubular landing gear strut 14, a lower nose wheel landing gear truck 16 pivotally carried on the lower end of the strut 14, and an intermediate servo or power steering mechanism shown generally at 18, carried on the strut 14 adjacently above the landing gear truck 16.

The landing gear strut 14 may be connected at its upper end to a suitable hinge structure, not shown, within the aircraft fuselage, which provides for limited forward and rearward swinging movement of the landing gear between a fully extended position as shown in FIGURE 1 and a fully folded or retracted poistion within the fuselage. Such extending and retracting movement of the landing gear, and the rigid support thereof when in extended position, as shown in FIGURE 1, is effected by means of a diagonal drag link member 20 which extends between a lower hinged connection, hidden from view, fixed to an intermediate section of the strut 14 adjacent the power steering mechanism 18, and a suitable actuator mechanism within the aircraft fuselage for forceable movement of the link member 20 in a generally axial direction.

Figure 2:
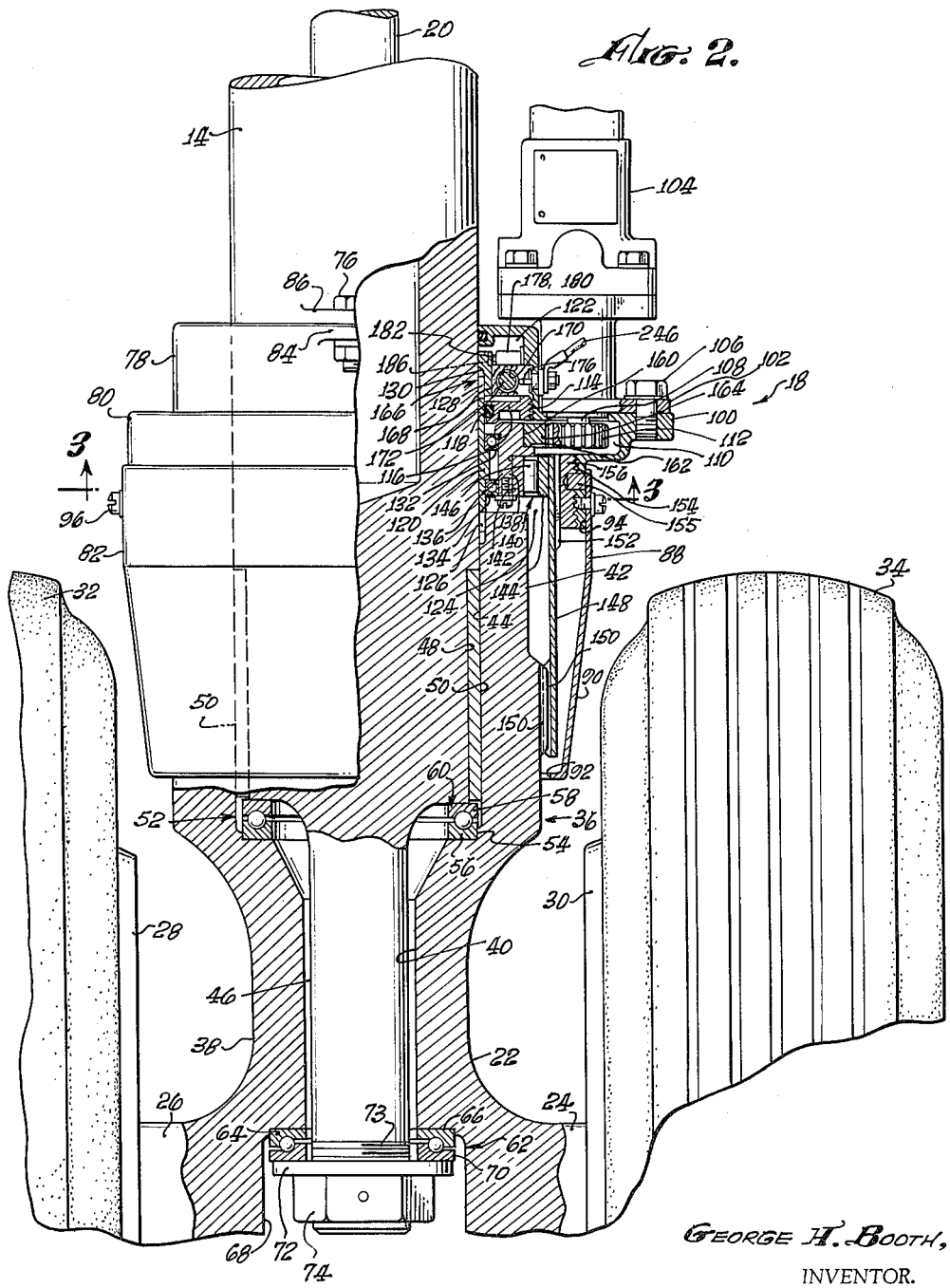
FIGURE 2 is an enlarged view partly in elevation and partly in vertical section of the general assembly of the apparatus of the invention shown in FIGURE 1.

The nose wheel landing gear truck 16 includes a central, tubular yoke member 22 which carries a pair of oppositely laterally extending wheel axle members, the inner adjacent root portions of which are partially visible at 24 and 26 in FIGURE 2. Rotatably mounted on the aforesaid axle members 24 and 26, by means of conventional wheel and axle bearings, are a pair of landing wheels 28 and 30 upon which, in turn, are mounted pneumatic tires 32 and 34.

Integrally formed with and extending upwardly from the yoke member 22, is a tubular pivot bearing body shown generally at 36, by means of which the yoke member 22 and the truck 16 is coaxially pivotally attached to the lower end of the strut 14 as aforesaid. The tubular body 36 is formed with a lower tubular neck portion 38 having a bore 40 of reduced inside diameter and a correspondingly reduced outside diameter, terminating in an upper annular bearing support collar 42 having a bore 44 of relatively increased inside diameter and correspondingly increased outside diameter. The lower end portion of the strut 14 is formed with adjacent, axially spaced-apart lower and upper sections 46 and 48 of step-wise reduced outside diameter, which extend coaxially within the corersponding bores 40 and 44 respectively of the neck portion 38 and the collar 42 of the pivot bearing body 36.

Press-fitted on the reduced diameter section 48 of the strut 14 is a sleeve bearing bushing 50, the exterior cylindrical surface of which makes rotatable radial bearing engagement with the bore 44 of the bearing support collar 42. Located coaxially within the pivot bearing body 36 is an axial thrust ball bearing 52, the lower race 54 of which is seated on an upwardly facing annular shoulder 56 formed at the juncture of the lower and upper bores 40 and 44 of the pivot bearing body 36, and the upper race 58 of which is seated against a downwardly facing annular shoulder 60 formed at the juncture of the lower and upper sections of reduced diameters 46 and 48 of the strut 14. The axial thrust bearing 52 serves pivotally to transmit the axial thrust between the strut 14 and landing gear truck 16 resulting from the weight of the aircraft and the vertical landing shocks resulting from landing operations.

Located coaxially within the lowermost portion of the pivot bearing body 36 and within the yoke member 22 is a combined axial and radial thrust ball bearing 62, the upper race 64 of which is seated against a downwardly facing annular shoulder 66 formed in the bottom of a counterbore 68 extending coaxially upwardly into the lower side of the yoke member 22, and the lower race 70 of which is seated upon the upper surface of an annular retainer 72 which is, in turn, coaxially retained on the threaded lower end 73 of the reduced diameter portion 46 of the strut 14 by means of a retainer nut 74. The ball bearing 62 serves pivotally to support the weight of the pivot bearing body 36, yoke member 22, axle member 24 and 26, landing wheels 28 and 30 and tires thereon, when the weight of the aircraft is removed from the landing gear, as when the aircraft becomes airborne, and also serves to transmit a certain portion of the radial thrust occuring as a result of landing shocks, brakeing, steering and the like ground maneuvers.

Fixedly attached to the landing gear strut 14 by means of fore and aft bolts, one of which is visible at 76 in FIGURE 2, is a steering mechanism-housing assembly which contains and suports the hereinbefore mentioned servo steering mechanism shown generally at 18, such housing assembly comprising generally annular shaped, integrally formed, upper and intermediate housing sections 78 and 80 respectively coaxially encircling the strut 14 and a lower generally cylindrical housing shield member 82. The upper housing section 78 is provided with forwardly and rearwardly radially extending lugs as shown at 84 which are bolted to correspondingly located, radially extending lugs 86 integrally formed on the strut 14, by means of the before-mentioned bolts 76 which pass through registering bolt holes in the lugs 84 and 86. The lower housing shield 82 has an upper cylindrical portion 88 of uniform outside diameter and an integrally formed downwardly converging frusto-conical skirt portion 90 which terminates at its lower end in a circular opening 92 which closely encircles the intermediate external cylindrical surface of the pivot bearing body 36. The upper cylindrical portion 88 of the lower housing shield 82 is detachably coupled over the lower cylindrical exterior portion of the intermediate housing section 80 as shown at 94, and detachably retained thereon by means of a plurality of circumferentially spaced-apart, radially extending machine screws 96 which extend through the shield into threaded holes of the housing section 80.

The housing sections 78 and 80 are provided with an integrally formed, laterally extending motor mounting platform 100 upon which the lower flanged base 102 of a hydraulic motor 104 is bolted as shown at 106. The hydraulic motor 104 may be of any suitable type such as, for example, a Vickers positive displacement hydraulic motor model No. MF3906 manufactured by Vickers, Inc. Such hydraulic motor is provided with an output drive shaft 108 which extends vertically into a pinion gear chamber 110 provided in the beforementioned laterally extending hydraulic motor supporting platform 100. A drive pinion 112 is fixed to the lower end of the drive shaft 108.

The interior juncture portion of the upper and lower housing sections 78 and 80 is provided with a short interval of internal threads 114 into which is threaded a generally annular diaphragm member 116 which carries a radially inwardly racing O-ring seal as shown at 118 which makes rotatable sealing engagement with the exterior upper surface portion of a sleeve member 120 and which, together with the sleeve member 120, separates the annular cavity 122 within the upper housing section 78 from the annular cavity 124 contained in the upper portion of the intermediate housing section 80.

The sleeve member 120 is rotatably supported on the adjacent exterior surface of the strut 14. The lower end of the sleeve member 120 is spline connected at 126 to the upper interior end portion of the bearing support collar 42. The upper end of the sleeve member 120 is similarly spline connected at 128 with an annular transducer carrier bushing 130 which is rotatable upon the strut 14 and serves to support certain transducer and limit switch mechanisms as will be hereinafter more fully described.

The sleeve 120 supports a pair of axially spaced-apart radial ball bearings 132 and 134 which, in turn, coaxially rotatably support a generally annular cam member 136. The bore of the cam member 136 which is rotatably supported on the outer races of ball bearings 132 and 134 is cylindrical, but the radially outwardly facing exterior side of the cam member 136 is formed with an outwardly facing peripheral surface portion 138 which is generally elliptoidal in cross-sectional form as best shown in FIGURE 3, the major and minor diameters 137 and 139 of which intersect one another on the longitudinal axis 141 of the strut 14.

Carried on and encompassing the elliptoidal cam surface 138 is a roller bearing assembly 140 having inner and outer radially flexible roller races 142 and 144 respectively, and a complement of bearing rollers 146 retained therebetween. The inner flexible roller race 142 tightly encompasses the elliptoidal cam surface 138 whereby it is imparted an elliptoidal form exactly conforming with that of the cam surface 138, and likewise the flexible outer roller race, while rotatably supported by the bearing rollers, is likewise thereby constrained to an elliptoidal form conforming to that of the inner race 142 and the elliptoidal cam surface 138. The outer race 144 of the roller bearing 140 makes a snug fit within the upper end of a relatively thin-walled, diametrally resiliently flexible tubular drive member 148, which is also thereby deflected, adjacent its upper end, into an elliptoidal form conforming to that of the cam surface 138. The drive member 148 is spline connected at its lower end, as shown at 150, to the exterior of the bearing support collar 42, whereby rotational torque imparted to the upper end of the tubular drive member 148 may be transferred therethrough to the bearing support collar 42. The upper, exterior portion of the flexible tubular drive member 148, radially opposite the roller bearing 140, is formed with axially elongated, external, spline-like gear teeth as best shown at 152 in FIGURE 3.

Figure 3:
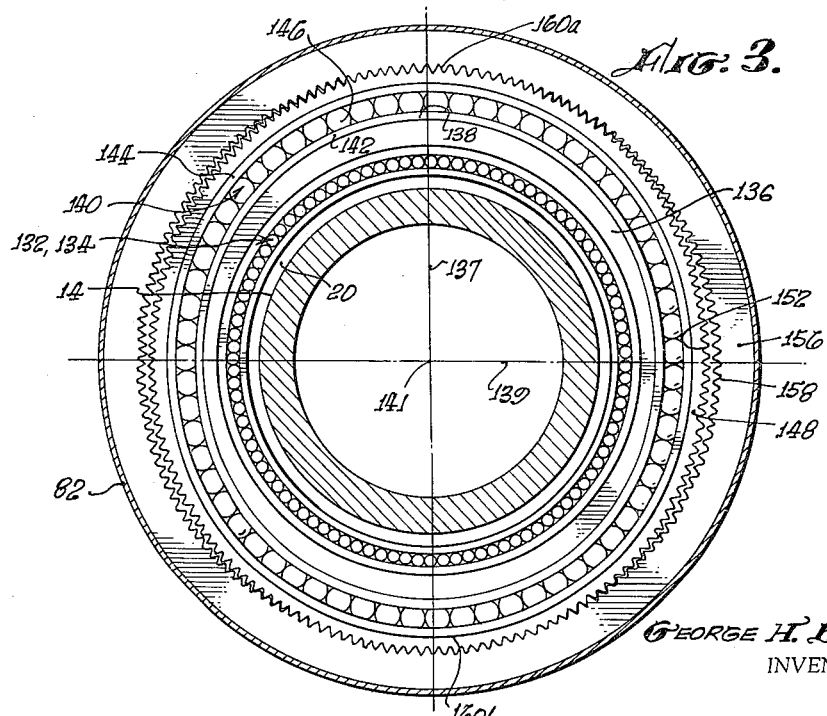
FIGURE 3 is a cross-sectional view taken on line 3—3 of FIGURE 2.

Coaxially surrounding the splined upper end of the tubular drive member 148 and threadedly supported at 154 within the inner surface of the intermediate housing section 80, is a diametrically rigid, annular, splined member 156 which has formed around the inner surface thereof axially elongated, internal spline-like gear teeth 158, as best shown in FIGURE 3, which match the form of and have the same diametrical pitch as the beforementioned spline-like gear teeth 152 on the exterior of the tubular drive member 148. The external annular splined member 156 is secured against rotation relative to the housing section 80 by a plurality of radial pins as shown at 155.

In the particular construction of the apparatus herein illustrated, wherein the peripheral surface 138 of the cam member 136 is elliptoidal in form and whereby the upper end portion of the diametrically resilient tubular drive member 148 is likewise constrained by the roller bearing 146 to assume an elliptoidal form, the spline teeth of the flexible tubular drive member make meshing engagement with the spline teeth of the annular spline member 156 only over a relatively short interval at diametrically opposite locations lying on the major diameter of the cam member 136 as shown at 160a and 160b, and under such circumstances the number of spline teeth carried by the outer annular spline member 156 must be greater than the number of matching spline teeth on the inner flexible tubular drive member 148, the effect of which in the operation of the apparatus will be hereinafter more fully explained.

Referring again to the cam member 136, the upper end portion thereof is formed with a coaxial, cylindrical outer surface portion 160 terminating at its lower end in an upwardly facing, annular shoulder 162 upon which is fixedly seated a ring gear 164. The ring gear 164 is drivingly engaged by the beforementioned pinion drive gear 112 mounted on the hydraulic motor output drive shaft 108.

Carried upon and fixed to the beforementioned transducer carrier bushing 130 within the annular chamber 122, is an annular transducer assembly 166 comprising an annular insulating ring 168 formed with a radially outwardly facing groove 170 in which is retained an annular electrical resistor element 172. The annular electrical resistor element 172 is electrically open at one point in the circumference thereof as schematically illustrated at 174 in FIGURE 4. A brush or contact element 176 supported through an insulating brushing in the upper housing section 78 makes sliding electrical contact with the resistor element 172, intermediate the opposite ends thereof.

Figure 4:
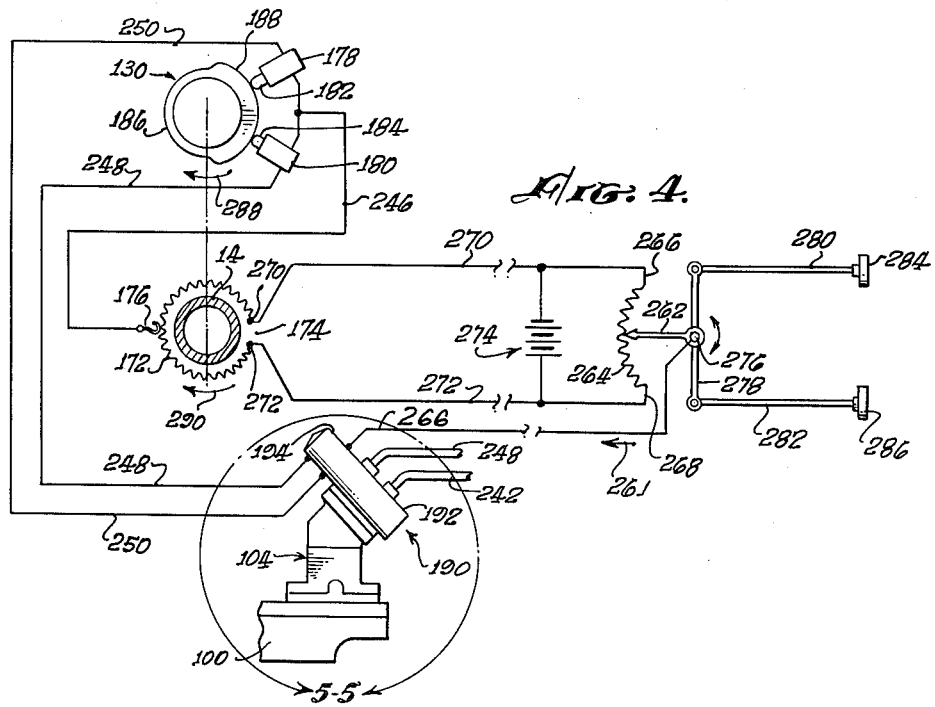
FIGURE 4 is a schematic diagram of the electrical control circuitry and certain elements of the apparatus of FIGURES 1, 2 and 3 associated therewith.

Also contained within the beforementioned annular cavity 122 and fixed to the inner wall of the upper housing section 78 is a pair of angularly spaced-apart electrical limit switches 178 and 180, as schematically illustrated in FIGURE 4 one of which is in view at 180 in FIGURE 2, such switches being preferably of the well-known microswitch type. The limit switches 178 and 180 are provided with actuating cam follower buttons 182 and 184 which are spring-pressed into sliding engagement with the radially outwardly facing cam-like circumference of the transducer carrier bushing 130 adjacent the beforementioned annular insulating ring 168. The construction and action of the microswitches 178 and 180 are such that when the cam follower buttons 182 or 184 are in their most extended positions relative to the switch enclosure, the switching circuit therein is open and when they are in their most inwardly depressed positions, the switching circuits therein are closed. The transducer carrier bushing 130 is formed adjacent its upper end with a cam-like surface having a periphery formed with an arcuate depressed portion 186 and an arcuate cam-like radially extended portion 188, the junctures of which are located angularly about the longitudinal axis of the strut 14 at the opposite positions at which it is desired to limit the powered rotational steering movement of the landing gear wheels relative to the landing gear strut 14.

Mounted on the top portion of the hydraulic motor 104 is an electromagnetically actuated motor control unit shown generally at 190 and comprising a hydraulic motor control valve portion 192 and an electric solenoid valve actuating portion 194 operatively coupled together as will be hereinafter more fully described. The hydraulic valve portion 192 is provided with a cylinder 196 having a coaxial valve bore 198 therein. Axially slidable within the valve bore 198 is a spool-shaped piston valve element 200. The piston valve element 200 is formed with a pair of cylindrical valve elements 202 and 204 separated axially by an integrally formed intermediate stem portion 206 of reduced diameter, thereby providing an annular clearance space 208 therebetween. The piston valve element 200 is provided with an axial pasage therethrough from end to end, whereby the opposite ends of the bore 198 are in communication with one another. The piston valve element 200 is connected to a pair of axially, oppositely extending piston rods 210 and 212 which project slidably out through the opposite ends of the cylinder 196 through suitable packing glands.

The before mentioned piston rod 212 extends into an adjacent, coaxial bore 216 and terminates in a cylindrical disk member 218. A pair of helical springs 220 and 222 which extend between opposite ends of the bore 216 and adjacently opposite sides of the disk 218 serve normally to bias the disk and in turn the piston valve 200 to the central position within the valve bore illustrated in FIGURE 5. Piston 210 extends coaxially into the housing of the beforementioned electric solenoid valve actuating portion 194 and carries on the end thereof a solenoid armature 226. Also contained within the housing of the solenoid valve actuating portion 194 is a pair of axially oppositely positioned solenoid windings 228 and 230 into which the solenoid armature 226 is adapted to coaxially move, the solenoid winding 228 being positioned such that when electrically energized, the solenoid armature 226 has a magnetic force applied to it tending to move it in a left-hand direction, as viewed in FIGURE 5, against the centralizing force of the springs 220 and 222 and the solenoid winding 230 being so positioned that when energized, it tends to move the solenoid armature 226 in a right-hand direction, as viewed in FIGURE 5, against the centralizing force of the springs 220 and 222.

The valve cylinder 196 is provided with a fluid pressure inlet connection 232 which communicates with opposite ends of the cylinder bore 198 by way of the beforementioned coaxial pasage through the piston valve 200. The cylinder 196 is also provided with an outlet port 234 which communicates with the central portion of the cylinder bore 198 at a point normally intermediate the adjacent opposite edges of the cylindrical valve elements 202 and 204. The cylinder 196 is also provided with a pair of internal ducts 236 and 238 communicating with the cylinder bore 198 at axially spaced-apart locations normally covered by the beforementioned cylindrical valve elements 202 and 204 respectively of the piston valve 200 when in centered position as shown. The ducts 236 and 238 lead to the hydraulic motor 104 whereby upon actuation of the valve mechanism, hydraulic fluid under pressure may be directed through the motor 104 in either direction as required to cause the hydraulic motor correspondingly to rotate in either direction. The beforementioned pressure inlet connection 232 and outlet port 234 are connected through flexible lines 240 and 242 respectively, with suitable hydraulic pressure supply and discharge receiving means, not shown, located within the aircraft fuselage.

Referring again primarily to FIGURES 4 and 5, a suitable bridge-type electrical control circuit for the steering apparatus is shown. The before mentioned contact brush 176 which makes slidable electrical contact with the annular resistor element 172 is connected through conductor 246 to both of the limit switches 178 and 180 and thence through conductors 248 and 250 each to one terminal of solenoid windings 228 and 230 respectively. Connected in series with the conductors 248 and 250 and solenoid windings 228 and 230 are diodes 252 and 254 respectively, diode 252 being connected in the circuit with its polarity such that it permits direct current to flow therethrough only in the direction indicated by arrow 256 and diode 254 similarly being connected in the circuit with its polarity such as to permit current to flow therethrough only in the direction indicated by arrow 258. The opposite terminals of the solenoid windings 228 and 230 are connected in parallel through conductor 260 to a contactor arm 262 which in turn makes sliding electrical contact with an arcuate resistor element 264.

The opposite ends 266 and 268 of the resistor element 264 are connected through conductors 270 and 272 respectively to the opposite ends 270 and 272 of the beforementioned annular resistor element 172. A suitable source of direct current, such as for example a battery 274, is connected between the conductors 270 and 272 to supply the potential and current necessary for operation of the circuit. The contactor arm 262 is rotationally moved relative to the arcuate resistor element 264 about a center 276 by a cross-lever 278, the opposite ends of which are linked through suitable control elements 280, 282 to rudder control pedals 284 and 286 respectively, located in the pilot's compartment within the aircraft fuselage.

Figure 5:
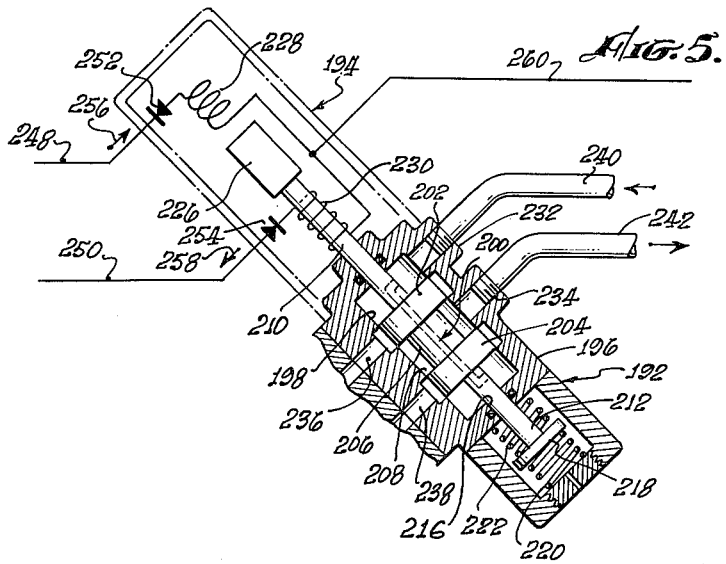
FIGURE 5 is an enlarged schematic detailed illustration of the portion of FIGURE 4 within the arrowed, broken lined circle 5—5 .

The operation of the hereinbefore described apparatus is as follows:

The neutral position of the steering mechanism and nose wheels as shown in FIGURES 1 and 2 and of the control apparatus as shown in FIGURES 4 and 5, correspond with that occurring when the aircraft is in a straight running or taxiing course on the ground. Under such conditions, the bridge circuit illustrated in FIGURE 4 is substantially balanced with no current flowing in the circuit comprising conductor 246, conductors 248 and 250, solenoid windings 228 and 230, and conductor 260, and the piston valve 200 is in the neutral or centralized position shown in FIGURE 5. Assuming then, that it is desired to pivot the nose wheels in such direction as to steer the aircraft in a right-hand direction from the straight forward course, suitable foot pressures is applied to the right-hand rudder control pedal 284 which, through the control element 280, causes the contactor arm 262 to be rotated in a counter-clockwise direction from the centralized position shown in FIGURE 4, along the arcuate resistor element 264. Such displacement of the contact arm relative to the resistor 264 unbalances the bridge circuit such as to cause direct current to flow in a given direction, say for example in the direction indicated by the arrow 261, through conductor 260 and thence through solenoid winding 230, diode 254, conductor 250, limit switch 178, and return through conductor 246 and contactor 176 to the annular resistor element 172. Corresponding flow of current through the solenoid winding 228 is prevented by the diode 252 and thus only the solenoid winding 230 is energized. Such energization of the solenoid winding 230 causes the solenoid armature 226 to be moved axially in a right-hand direction as viewed in FIGURE 5, thereby displacing the piston valve 200 against the force of springs 220 and 222 such as to permit pressure fluid to flow from the inlet connection 232 into the duct 236 leading to the hydraulic motor 104 and, at the same time, permit fluid discharged from the hydraulic motor through duct 238 to enter the annular space 208 between the valve elements 202 and 204 and thence to be discharged through the outlet connection 234. The hydraulic motor 104 is thus energized by the pressure fluid, thereby driving the pinion gear 112 in such a direction as to cause the steering mechanism 18 to rotate the pivot bearing body 36, landing gear truck 16, and the steering wheels carried thereby in a right-hand direction, thereby correspondingly rotating the sleeve member 120, transducer carrier bushing 130 and the annular resistor element 172 carried thereby in a corresponding right-hand direction as indicated by arrows 288 and 290 in FIGURE 4. Such rotation of the annular resistor element 172 continues until its position relative to the contact element 176 changes sufficiently to re-establish balance in the bridge circuit, under which balanced condition current ceases to flow through the solenoid winding 230 permitting the piston valve 200 to re-center in the valve bore 198, thereby cutting off further flow of pressure fluid to the hydraulic motor 104.

In the event it is desired to rotate the steering wheels in a left-hand direction, either to return them from their previous right-hand pivotal position to a neutral position or to rotate them such as to steer the aircraft in a left-hand direction from a straight forward course, pressure is applied to the left-hand rudder control pedal 286 thereby rotating the contactor arm 262 in a clockwise direction relative to the resistor element 264, thereby disturbing the balance of the bridge circuit such as to cause current to flow in a direction opposite to that illustrated by arrow 261, through conductor 260, solenoid winding 228, conductor 248, limit switch 180, conductor 246 and contact element 176. Under the latter condition, flow of current through the solenoid winding 230 is prevented by the diode 254. The resultant flow of current through the solenoid winding 228 causes the piston valve 200 to be displaced axially in a left-hand direction, as viewed in FIGURE 5, against the opposing force of springs 220 and 222, thereby permitting pressure fluid to flow from connection 232 through the central passage in the piston valve 200 and thence through the duct 238 to the hydraulic motor 104, and at the same time, permitting pressure fluid discharged from the motor 104 to flow out through duct 236 and into the annular clearance 208 and thence through the outlet connection 234, resulting in rotation of the hydraulic motor 104 and the drive pinion 112 in reverse to that before described. This latter rotation of the drive pinion 112 causes the pivot bearing body 36 and the annular resistor element 172 to be rotated in a left-hand or counter-clockwise direction as viewed in FIGURE 4, opposite to that indicated by the beforementioned arrows 288 and 290. Such rotation of the resistor element 172 relative to the contact element 176 continues until reestablishment of balance of the bridge circuit occurs under which condition the flow of current through the solenoid winding 228 ceases and the piston valve 200 is allowed again to return to the neutral position illustrated in FIGURE 5, under which condition operation of the hydraulic drive motor 104 correspondingly ceases. Thus, by movement of the right and left-hand rudder control pedals 284 and 286, right and left-hand steering movement is imparted to the steering control apparatus and the landing wheels 28 and 30 carried thereby.

In the event the rotation of the steerable landing gear apparatus is permitting to continue by continued pressure on one or the other on the rudder control pedals 284 and 286 sufficient to permit one or the other of the cam follower buttons 182 and 184 of limit switches 178 and 180 to drop into the arcuate cam depression 186, the corresponding limit switch is thereby caused to open, cutting off the current from the operating solenoid winding, thereby permitting the piston valve 200 to return to its neutral position to deenergize motor 104 and prevent further powered rotation of the steerable landing gear apparatus beyond such limiting point. Further unlimited rotation of the steerable gear in either direction beyond such powered operation limiting points, may be readily accomplished manually by ground personnel, by attaching a suitable tow bar to the forwardly protruding portion of the landing gear truck 16.

The operation more specifically of the steering apparatus shown and hereinbefore described in connection with FIGURES 2 and 3 is as follows:

Rotation of the pinion gear 112 by the hydraulic motor 104 results in rotation of the ring gear 164 which, being attached to the annular cam member 136, results in corresponding rotation of the annular cam member 136 upon the ball bearing 132 and 134, thereby, in turn, rotating therewith the elliptoidal peripheral surface 138 and the inner roller bearing race 142 carried thereby. The elliptoidal form of the rotating surface 138 is carried through the roller bearing and is thereby imposed, as a correspondingly rotating elliptoidal distortion, upon the flexible outer roller bearing race 144 which, in turn, imparts such rotational distortion to the upper end portion of the flexible tubular drive member 148. The points of engagement 160a and 160b between the spline teeth 152 on the exterior of the flexible tubular drive member 148, and the spline teeth on the inner surface of the annular spline member 156 is thus caused to correspondingly rotate relative to the aforesaid annular spline member 156. As is best shown in FIGURE 3, the spline teeth 152 and 158 are out of engagement with one another along a major portion of the peripheral portions thereof intermediate the beforementioned points of engagement 160a and 160b lying on the major diameter of the elliptoidal cam member 136.

In the particular construction hereinbefore described, where the number of spline teeth 158 carried by the annular spline member 156 is greater than the number of matching spline teeth 152 carried on the flexible tubular drive member 148, each rotation of the cam member 136 carrying the elliptoidal surface 138 results in rotation of the annular spline member 156 in a direction relatively counter to that of the rotation of cam member 136 through an angle corresponding to that subtended by a number of teeth equal to the difference in the number of teeth 158 and 152. Thus, as a typical example of a suitable construction of the apparatus of the invention in which the annular spline member 156 has 132 spline teeth and the flexible tubular drive member 148 has 130 spline teeth, the effective gear ratio between the cam member 136 and the annular spline member 156 is equal to 132 divided by 2, or a ratio of 66 to 1. Also in a practical design wherein the gear ratio between the pinion drive gear 112 and the ring gear 164 is 7 to 1, the resulting overall gear ratio between the drive shaft 108 of the hydraulic motor 104 and the annular spline member 156 is 462 to 1.

Inasmuch as the annular spline member 156 is coupled through the housing sections 78 and 80 to the strut 14, and the flexible tubular drive member 148 is coupled through spline connection 150 to the pivot bearing body 36 which carries at its lower end the yoke member 22 and wheel truck and axles attached thereto, pivotal motion of the landing wheels relative to the strut 14 in one direction or the other results from and is dependent upon the direction of rotation of the drive shaft 108 of the hydraulic motor 104. Thus, the gear ratio between the drive shaft 108 of the hydraulic motor 104 and the resultant pivotal rotation of the landing wheel will be 461 to 1 as aforesaid. A very high gear ratio is thereby obtained between the steering motor and the landing wheels, with a minimum of gear reduction stages and other associated complications.

The steering apparatus of this invention has advantages in addition to those hereinbefore mentioned, of being capable of providing very large gear reduction ratios between the steering motor and the steering wheels with a minimum number of gear trains, and with such gear trains in the form of annular gears which closely encircle the landing gear strut. This results not only in compactness and lightness of construction, but results in all of the major driving forces which impart torque to the steering wheels relative to the landing strut, having substantially all of their lateral components balanced whereby in operation substantially no radial forces are imposed upon the steering mechanism.

Another advantage of the steering mechanism of this invention is that it is possible to make it of such compactness and lightness that it can be carried closely adjacent the landing wheels as a part of the unsprung mass of the landing gear.

Another advantage of the steering mechanism of this invention as compared with more conventional gear reduction and hydraulic actuator systems resides, because of its high mechanical efficiency, in its relatively free reversibility whereby the landing gear wheel remains, freely and fully manually pivotal at all times without the necessity of disconnecting it from the power actuating mechanism.

Still another advantage of the steering system of this invention resides in its unique adaptability to a compact, concentric assembly upon a landing gear strut.

It is to be understood that the foregoing is illustrative only and that the invention is not limited thereby, but may include various modifications and changes made by those skilled in the art within the scope of the invention as defined in the appended claims.

What is claimed is:

1. In an aircraft landing gear, steering apparatus comprising:
   a strut member;
   a wheel supporting member for carrying a landing wheel means thereon, said wheel supporting member rotatably supported by said strut supporting member;
   a toothed, flexible spline member rotatably supported by and coaxially drivingly coupled to one of said supporting members;
   a cam member rotatable coaxially of and engaging said flexible spline member to cause a rotating distortion of said flexible spline member upon rotation of said cam member relative thereto;
   a toothed circular spline member coupled to the other of said supporting members and engaging said flexible spline member such that the teeth of said flexible spline member mesh with the teeth of said circular spline member only along a limited arcuate portion adjacent the point of major distortion thereof, the number of said teeth of said flexible spline member being different from the number of teeth of said circular spline member;
   and power means drivingly coupled to said cam member for rotation of said cam member relative to said flexible spline member, whereby rotation is imparted to said supporting members relative to one another.

2. In an aircraft landing gear, steering apparatus comprising:

a strut member adapted to be connected to an aircraft structure;

a supporting member for carrying a landing wheel means adjacent the lower end thereof, said supporting member having a bore therethrough through which said strut member coaxially extends and upon which said supporting member is rotatably supported;

a cam member coaxially rotatably mounted on said strut member;

an externally toothed flexible spline member coaxially rotatably supported upon said cam member such that rotation of said cam member relative to said flexible spline member generates a correspondingly rotating diametrical distortion of said flexible spline member;

means non-rotationally coupling said flexible spline member to said supporting member;

an internally toothed circular spline coupled to said strut member and encompassing said flexible spline member with the external teeth of said flexible spline member meshing with the internal teeth of said circular spline only along limited diametrical portions thereof intersected by a major diameter of said cam member, the number of said teeth of said flexible spline member being different from the number of said teeth of said circular spline;

and means carried by said strut member and drivingly coupled to said cam member for coaxial rotation of said cam member relative to said strut member, said supporting member and said flexible spline member, whereby upon such rotation, the torque thus generated between said flexible spline member and said circular spline imparts rotation to said supporting member relative to said strut member.

3. In an aircraft landing gear, steering apparatus comprising:

a strut member adapted to be connected to an aircraft structure;

a supporting member for carrying a landing wheel means adjacent the lower end thereof, said supporting member having a bore therethrough through which said strut member coaxially extends and upon which said supporting member is rotatably supported;

an elliptoidal cam member coaxially rotatably mounted on said strut member;

a toothed, flexible spline member coupled to said supporting member and coaxially rotatably supported upon said cam member such that rotation of said cam member relative to said flexible spline member generates a correspondingly rotating elliptoidal distortion of said flexible spline member;

an internally toothed, circular spline coupled to said strut member and coaxially encompassing said flexible spline member, with the teeth of said flexible spline member meshing with the teeth of said circular spline only along limited diametrically opposite portions thereof intersected by the major diameter of said cam member, the number of said teeth of said flexible spline member being different from the number of said teeth of said circular spline;

a ring gear coaxially coupled to said cam member and encircling said strut member;

and power means carried by said strut member and having a drive pinion gear drivingly coupled to said ring gear for rotation of said cam member relative to said strut member, said supporting member and said flexible spline member, whereby upon such rotation the torque thus generated between said flexible spline member and said circular spline imparts relative rotation between said supporting member and said strut member.

4. In an aircraft landing gear, steering apparatus comprising:

a strut member adapted to be connected to an aircraft structure;

a supporting member for carrying a landing wheel means thereon, said supporting member being coaxially rotatably supported by said strut member;

an elliptoidal cam member coaxially rotatably mounted on said strut member;

a circumferentially toothed flexible spline member coupled to said supporting member and supported for rotation coaxially of said strut member with said cam member engaging said flexible spline member such that rotation of said cam member relative to said flexible spline member causes a correspondingly rotating elliptoidal distortion of said flexible spline member;

a circumferentially toothed circular spline coupled to said strut member coaxial with said flexible spline member with the teeth of said flexible spline member meshing with the teeth of said circular spline only along limited diametrically opposite portions thereof intersected by the major diameter of said cam member, the number of said teeth of said flexible spline member being different from the number of said teeth of said circular spline;

and means carried by said strut member and drivingly coupled to said cam member for rotation of said cam member relative to said strut member, said supporting member and said flexible spline member, whereby upon such rotation the torque thus generated between said flexible spline member and said circular spline imparts rotation to said supporting member relative to said strut member.

5. In an aircraft landing gear, steering apparatus comprising:

a strut member adapted to be connected to an aircraft structure;

a supporting member for carrying a landing wheel means adjacent the lower end thereof, said suppporting member having a bore therethrough through which said strut member coaxially extends and upon which said supporting member is rotatably supported;

an elliptoidal cam member coaxially rotatably mounted on said strut member;

an externally toothed radially flexible spline member coupled to said supporting member and coaxially rotatable relative to said cam member, there being bearing means between said cam member and said flexible spline member whereby upon rotation of said cam member relative to said flexible spline member a correspondingly rotating elliptoidal radial distortion is induced by said cam member in said flexible spline member;

an internally toothed circular spline coupled to said strut member and encompassing said flexible spline member with the teeth of said flexible spline member meshing with the teeth of said circular spline only along limited diametrically opposite portions thereof intersected by the major diameter of said cam member, the number of said teeth of said flexible spline member being different from the number of said teeth of said circular spline;

and means for rotation of said cam member relative to said strut member, said supporting member and said flexible spline member, whereby upon such rotation the torque thus generated between said flexible spline member and said circular spline imparts relative rotation between said supporting member and said strut member.

6. In an aircraft landing gear, steering apparatus comprising:

a strut member adapted to be connected to an aircraft structure;

a supporting member for carrying a landing wheel means thereon, said supporting member being coaxially rotatably supported by said strut member;

a cam member coaxially rotatably mounted on said strut member;

a circumferentially toothed flexible spline member coupled to said supporting member and coaxially rotatably supported upon said strut member with said cam member engaging said flexible spline member such that rotation of said cam member relative to said flexible spline member generates a correspondingly rotating region of distortion of said flexible spline member;

a circumferentially toothed circular spline coupled to said strut member coaxial with said flexible spline member, with the teeth of said flexible spline member meshing with the teeth of said circular spline only along a limited arcuate portion thereof adjacent the said region of distortion, the number of said teeth of said flexible spline member being different from the number of said teeth of said circular spline;

and means carried by said strut member and drivingly coupled to said cam member for rotation of said cam member relative to said strut member, said supporting member and said flexible spline member, whereby upon such rotation the torque thus generated between said flexible spline member and said circular spline imparts relative rotational torque between said supporting member and said strut member.

7. In an aircraft landing gear, steering apparatus comprising:

a strut member adapted to be connected to an aircraft structure;

a supporting member for carrying a landing wheel means thereon, said supporting member being coaxially rotatably supported by said strut member;

a cam member coaxially rotatably mounted on said strut member;

a circumferentially toothed flexible spline member coupled to said supporting member and coaxially rotatably supported upon said strut member with said cam member engaging said flexible spline member such that rotation of said cam member relative to said flexible spline member generates a correspondingly rotating region of distortion of said flexible spline member;

a circumferentially toothed circular spline coupled to said strut member coaxial with said flexible spline member, with the teeth of said flexible spline member meshing with the teeth of said circular spline only along a limited arcuate portion thereof adjacent the said region of distortion, the number of said teeth of said flexible spline member being different from the number of said teeth of said circular spline;

a ring gear coaxially carried by said cam member and encircling said strut member;

and power means carried by said strut member and having gear means drivingly coupled to said ring gear for rotation of said cam member relative to said strut member, said supporting member and said flexible spline member, whereby upon such rotation the torque thus generated between said flexible spline member and said circular spline imparts relative rotation between said supporting member and said strut member.

8. In an aircraft landing gear, steering apparatus comprising:

a strut member;

a supporting member for carrying a landing wheel means thereon, said supporting member being coaxially rotatably suported by said strut member;

a toothed, flexible spline member coaxially rotatably supported upon said strut member and drivingly coupled to said supporting member;

a cam member rotatable coaxially of said strut member and engaging said flexible spline member to cause a rotating distortion of said flexible spline member upon rotation of said cam member relative thereto;

a toothed circular spline coupled to said strut member and engaging said flexible spline member such that the teeth of said flexible spline member mesh with the teeth of said circular spline only along a limited arcuate portion thereof adjacent the point of major distortion thereof, the number of said teeth of said flexible spline member being different from the number of teeth of said circular spline;

power means fixed to said strut member and drivingly coupled to said cam member for rotation of said cam member relative to said flexible spline member, whereby rotation is imparted to said supporting member relative to said strut member;

an annular transducer means encircling said strut member, said transducer including means fixed to said strut member and means fixed to said supporting member for modifying an electric characteristic thereof in accordance with a function of the rotational displacement of said supporting member relative to said strut member;

and means responsive to such modification of said electric characteristic for controlling said power means.

9. In an aircraft landing gear, steering apparatus comprising:

a strut member;

a supporting member for carrying a landing wheel means thereon, said supporting member being coaxially rotatably supported by said strut member;

a toothed, flexible spline member coaxially rotatably supported upon said strut member and drivingly coupled to said supporting member;

a cam member rotatable coaxially of said strut member and engaging said flexible spline member to cause a rotating distortion of said flexible spline member upon rotation of said cam member relative thereto;

a toothed circular spline coupled to said strut member and engaging said flexible spline member such that the teeth of said flexible spline member mesh with the teeth of said circular spline only along a limited portion adjacent the area of major distortion thereof, the number of said teeth of said flexible spline member being different from the number of teeth of said circular spline;

power means fixed to said strut member and drivingly coupled to said cam member for rotation of said cam member relative to said flexible spline member, whereby rotation is imparted to said supporting member relative to said strut member;

a movable steering control means;

a transducer means encircling said strut member said transducer means being responsive to rotational displacement of said supporting member relative to said strut member;

and power control means responsive to said transducer means and said steering control means for controlling said power means such that the rotational displacement of said supporting member relative to said strut member bears a predetermined functional relation to the magnitude of movement of said steering control means.

10. In an aircraft landing gear, steering apparatus comprising:

a strut member;

a supporting member for carrying a landing wheel means thereon, said supporting member being coaxially rotatably supported by said strut member;

power means carried by said strut member and drivingly coupled to said supporting member for imparting rotation to said supporting member relative to said strut member;

transducer means including an annular transducer body encircling said strut member adjacent said supporting member and responsive to rotational displacement between said strut member and said supporting member;

power control means affected by such response of said transducer means for controlling said power means, said transducer means including means, operative in conjunction with said power control means for limiting to a predetermined angle, the powered rotational displacement of said supporting member relative to said strut member.

References Cited by the Examiner
UNITED STATES PATENTS

| | | | |
|---|---|---|---|
| 2,983,162 | 5/61 | Musser | 74—640 |
| 3,006,579 | 10/61 | Frederick | 244—50 |

FOREIGN PATENTS

| | | |
|---|---|---|
| 813,912 | 5/59 | Great Britain. |

FERGUS S. MIDDLETON, *Primary Examiner.*

UNITED STATES PATENT OFFICE
CERTIFICATE OF CORRECTION

Patent No. 3,211,400 October 12, 1965

George H. Booth

It is hereby certified that error appears in the above numbered patent requiring correction and that the said Letters Patent should read as corrected below.

Column 10, line 52, after "strut" insert -- supporting --; line 54, after "member" insert -- being --.

Signed and sealed this 12th day of July 1966.

(SEAL)
Attest:

ERNEST W. SWIDER
Attesting Officer

EDWARD J. BRENNER
Commissioner of Patents